Aug. 25, 1925.
J. O. LEE
1,551,108
SUNSHADE FOR THE SIDES OF VEHICLES
Filed March 17, 1925
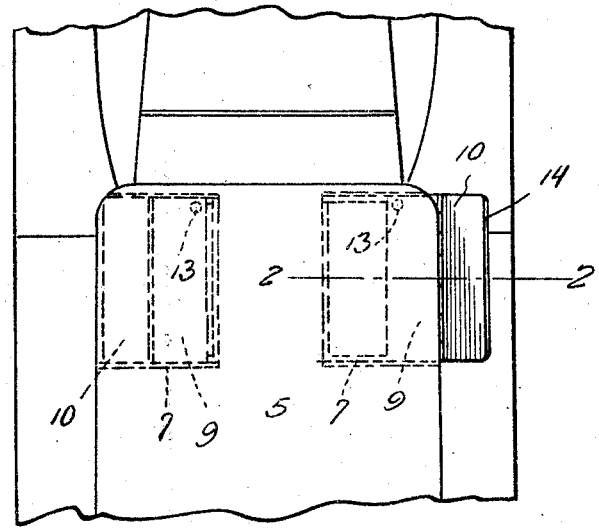
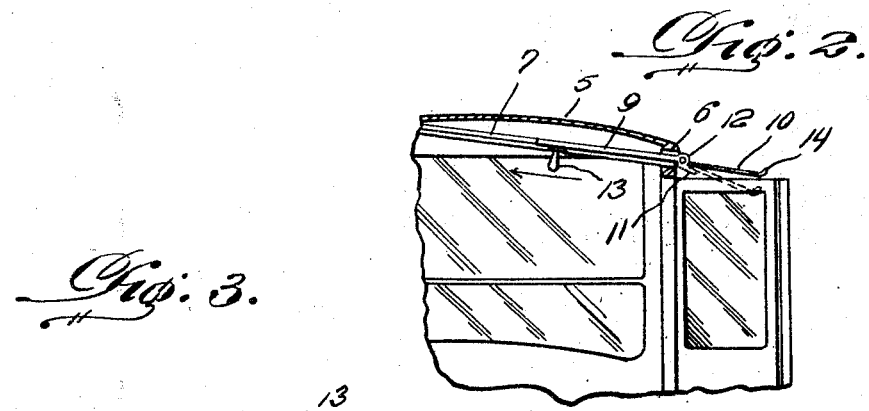
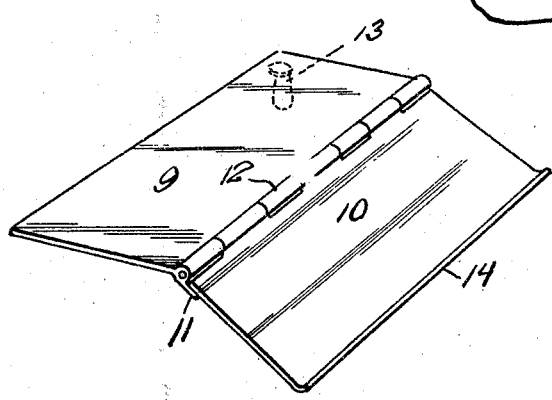
Inventor
J. O. Lee,
By
Attorney Patented Aug. 25, 1925.

1,551,108

UNITED STATES PATENT OFFICE.

JOHN ORSON LEE, OF LEWISTOWN, ILLINOIS.

SUNSHADE FOR THE SIDES OF VEHICLES.

Application filed March 17, 1925. Serial No. 16,166.

*To all whom it may concern:*

Be it known that I, JOHN O. LEE, a citizen of the United States, residing at Lewistown, in the county of Fulton and State of Illinois, have invented certain new and useful Improvements in Sunshades for the Sides of Vehicles, of which the following is a specification.

The present invention relates to a sun shade for such vehicle as closed automobiles and the like, and aims to provide a device of this nature, which may be mounted on the automobile body, in such a manner that it may be slid to either an active or inactive position.

An important object of the invention is to provide a shade of this nature, which will project out over the top of the door, and which is so constructed that when the door is open, the shade will be automatically raised, thereby not, in any way, interfering with the operation of the door, or interfering with the person going in and out of the doorway.

Other objects of the invention are to provide a shade of this nature, which possesses an attractive appearance, a simple structure, and one which will prove durable, strong and one which may be manufactured and installed in the car at a relatively low cost.

With the above and numerous other objects in view, as will appear as the description proceeds, the invention resides in the novel features of construction, and in the combination and arrangement of parts as will be hereinafter more fully described and claimed.

In the drawing:

Figure 1 is a fragmentary top plan view of an automobile, showing my improved shade structure associated therewith.

Figure 2 is a detail vertical section, taken substantially on the line 2—2 of Figure 1, but showing the door open, and Figure 3 is a detail perspective view of one of the shades.

Referring to the drawing in detail, it will be seen that 5 designates the top of an automobile body of the closed type. This top is provided with slots 6 in its sides over the doorway, and slide rails 7 project inwardly from these slots 6 and are inclined upwardly so as to terminate approximately centrally of the top, within the body. There are two of these rails projecting from each slot 6.

As all of the shades are identical in construction I shall only describe one in detail. The shade includes a plate 9 and a shade panel 10. The plate 9, at its outer edge is provided with an angular extension 11. The panel 10 is hinged to the juncture of the extension 11 with the plate 9, as at 12. This extension 11 forms a rest for the panel 10, so as to hold it inclined outwardly over the door normally. The plate 9 has its side edges resting on the rails 7, and a handle 13 depends downwardly from the plate so that it may be slid toward the center of the top thereby bringing the panel 10, in under the top. The outer or free edge of the shade panel 10 is curved upwardly, as at 14, thereby forming a stop, which will engage the side of the top adjacent the slot 6, when the shade panel is drawn inwardly. This curved edge will also form a rounded bearing surface, against which the upper edge of the door will engage as the door is swung to an open position, thereby raising the shade panel as is clearly indicated in Figure 2.

In the present illustration of the invention, I have shown these shades associated with the two front doors of the top, but it is evident that they may be similarly associated with the rear door or with other parts of the body. It is also apparent that numerous other changes in the details of construction, in the material, in the size, and in the combination and arrangement of parts may be resorted to, without departing from the spirit or scope of the invention as hereinafter claimed, or sacrificing any of its advantages.

Having thus described my invention, what I claim as new is:

1. As an article of manufacture, a shade for automobiles and the like including a plate having one edge provided with an angularly disposed extension, and a panel hinged to the plate at its juncture with its extension, the free edge of the panel being curved upwardly.

2. In combination, a top provided with a slot in its side, rails leading inwardly from the slot, a door below the slot, a shade slidable through the slot including a plate and a panel hinged thereto, the free end of the panel being curved upwardly for forming a stop, and a rounded surface against which the upper edge of the door may engage as it is opened, for raising the panel.

In testimony whereof I affix my signature.

JOHN ORSON LEE.